A. B. Ely,
Shoe Upper.
N° 69,082.   Patented Sep. 24, 1867.

Witnesses.
W. M. Parker
Sam'l C. Birdhead

Inventor.
Alfred B Ely

United States Patent Office.

ALFRED B. ELY, OF NEWTON, MASSACHUSETTS.

Letters Patent No. 69,082, dated September 24, 1867.

IMPROVEMENT IN BOOT AND SHOE-TIPS.

The Schedule referred to in these Letters Patent and making part of the same.

TO ALL WHOM IT MAY CONCERN:

Be it known that I, ALFRED B. ELY, of Newton, in the county of Middlesex, and State of Massachusetts, have invented a new and useful Tip for Boots and Shoes; and the following is a full, clear, and exact description of the construction and operation of the same, reference being had to the accompanying drawings, forming a part of this specification.

Figure 1:
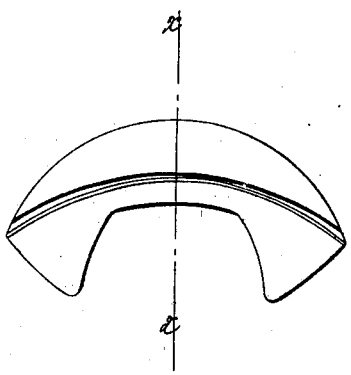
Figure 2:
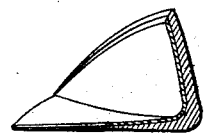

Figure 1 is a perspective, and
Figure 2 a sectional view of the tip.

Tips have been made of metal, and of India rubber or gutta percha, as well as of leather. The metallic tips, although very extensively used, are liable to become bent out of shape, and are objectionable from their metallic color. Rubber tips are too expensive, and leather tips do not fully answer the purpose desired of protection and durability.

The nature of my invention consists in making tips for boots and shoes of a mixture of rubber, or rubber and its compounds, with paper pulp, ground rags, or other analogous fibrous materials, whereby I produce a new article of manufacture, more elastic than metal, more durable than leather, water-proof, and cheaper than India rubber, gutta percha, or any of the preparations of rubber before known.

I do not confine myself to any particular proportions of rubber and pulp, or fibrous matter, as they may be varied according to the quality desired, except that I must use not less than one-third rubber, nor do I deem it desirable to use less than one-quarter pulp. A mixture of substantially equal proportions produces an excellent article. Cotton or linen rags, manilla paper stock, or other suitable similar materials, are to be ground up or reduced to pulp, and mechanically mixed with the ground rubber, and then the mixed material is vulcanized and reduced to form by moulds and other well-known modes of treating rubber.

A similar material has quite recently been adapted to stiffening for heels, but never before for tips. Preparations of rubber may have been used for tips, but this mixed material has never before been known or used for any such purpose as now proposed.

Having thus described my improvement, what I claim, and desire to secure by Letters Patent, is, as a new article of manufacture—

A moulded shoe-tip, made of rubber, mixed with ground rags or other suitable fibrous material, substantially as described.

ALFRED B. ELY.

Witnesses:
   W. M. PARKER,
   DANL. D. BRODHEAD.